United States Patent
Döring et al.

(10) Patent No.: US 10,400,655 B2
(45) Date of Patent: Sep. 3, 2019

(54) CATALYTIC CONVERTER UNIT AND EXHAUST GAS CATALYTIC CONVERTER

(71) Applicant: MAN DIESEL & TURBO SE, Augsburg (DE)

(72) Inventors: Andreas Döring, Unterhaching (DE); Martin Faber, Augsburg (DE); Richard Losher, Krumbach (DE); Francis Nana, München (DE)

(73) Assignee: MAN Energy Solutions SE, Augsburg (DE)

(*) Notice: Subject to any disclaimer, the term of this patent is extended or adjusted under 35 U.S.C. 154(b) by 32 days.

(21) Appl. No.: 15/563,250

(22) PCT Filed: Mar. 23, 2016

(86) PCT No.: PCT/EP2016/056438
§ 371 (c)(1),
(2) Date: Sep. 29, 2017

(87) PCT Pub. No.: WO2016/156163
PCT Pub. Date: Oct. 6, 2016

(65) Prior Publication Data
US 2018/0094567 A1 Apr. 5, 2018

(30) Foreign Application Priority Data

Mar. 30, 2015 (DE) .................. 10 2015 004 007
Oct. 13, 2015 (DE) .................. 10 2015 219 827

(51) Int. Cl.
*F01N 13/18* (2010.01)
*F01N 3/20* (2006.01)
(Continued)

(52) U.S. Cl.
CPC ....... *F01N 13/1844* (2013.01); *F01N 3/2066* (2013.01); *F01N 3/2839* (2013.01);
(Continued)

(58) Field of Classification Search
CPC .... F01N 13/017; F01N 13/18; F01N 13/1844; F01N 3/2066; F01N 3/2839;
(Continued)

(56) References Cited

U.S. PATENT DOCUMENTS

| 4,238,455 A | 12/1980 | Ogiwara |
| 2009/0293464 A1* | 12/2009 | Kaufmann .............. B23P 15/00 60/311 |
| 2014/0182270 A1* | 7/2014 | Jun .......................... F01N 9/00 60/274 |

FOREIGN PATENT DOCUMENTS

| DE | 102011001367 | 9/2012 |
| EP | 0 501 733 | 9/1992 |

(Continued)

OTHER PUBLICATIONS

Office Action dated Oct. 1, 2018 issued in the corresponding Japanese Patent Application No. 2017-550878.
(Continued)

*Primary Examiner* — Brandon D Lee
(74) *Attorney, Agent, or Firm* — Cozen O'Connor

(57) ABSTRACT

Catalytic converter unit for an exhaust gas catalytic converter, in particular an SCR catalytic converter unit for an SCR catalytic converter of a marine diesel internal combustion engine, with multiple catalytic converter modules. Each catalytic converter module has a ceramic catalytic converter body through which exhaust gas flows and a metallic casing for the ceramic catalytic converter body. The respective ceramic catalytic converter body is received in the respective metallic casing and is surrounded in certain sections by the latter. The catalytic converter modules are positioned with first flowed-through ends on a support grating. A counter-brace is positioned at the opposite second flowed-through ends of the catalytic converter modules, and the catalytic converter modules are clamped between the support grating and the counter-brace.

14 Claims, 4 Drawing Sheets

(51) Int. Cl.
*F01N 3/28* (2006.01)
*F01N 13/00* (2010.01)

(52) U.S. Cl.
CPC ......... *F01N 3/2842* (2013.01); *F01N 13/017* (2014.06); *F01N 13/18* (2013.01); *F01N 2330/06* (2013.01); *F01N 2450/30* (2013.01); *F01N 2590/02* (2013.01); *Y02T 10/24* (2013.01)

(58) Field of Classification Search
CPC ............... F01N 3/2842; F01N 2330/06; F01N 2450/30; F01N 2590/02; Y02T 10/24
See application file for complete search history.

(56) References Cited

FOREIGN PATENT DOCUMENTS

| | | |
|---|---|---|
| JP | S 62103428 U | 7/1987 |
| JP | H 02-117027 U | 9/1990 |
| JP | 30-58445 | 3/1999 |
| JP | 2014-188471 | 10/2014 |
| KR | 10-2014-0067633 | 6/2014 |

OTHER PUBLICATIONS

Office Action dated Mar. 5, 2019 issued in Chinese Patent Application No. 201680019927.7.

\* cited by examiner

CATALYTIC CONVERTER UNIT AND EXHAUST GAS CATALYTIC CONVERTER

CROSS REFERENCE TO RELATED APPLICATIONS

This is a U.S. national stage of application No. PCT/EP2016/056438, filed on Mar. 23, 2016. Priority is claimed on German Application No. DE102015004007.3 filed Mar. 30, 2015; and German Application No. DE102015219827.8, the content of which are incorporated here by reference.

BACKGROUND OF THE INVENTION

1. Field of the Invention

The invention relates to a catalytic converter unit and an exhaust gas catalytic converter.

2. Description of the Prior Art

A catalytic converter unit for an exhaust gas catalytic converter comprises a plurality of catalytic converter modules. Each catalytic converter module comprises a catalytic converter body through which exhaust gas flows and a metallic casing that is rectangular in cross section for the ceramic catalytic converter body, wherein the casing is also called canning. The casing of the respective catalytic converter module accommodates the respective catalytic converter body and surrounds the same in certain sections leaving the flowed-through ends of the catalytic converter body open, wherein a flowed-through end provides an inflow end and the other flowed-through end an outflow end of the respective catalytic converter body.

In catalytic converter units known from practice, the catalytic converter modules are arranged array-like in the form of a plurality of lines and columns, wherein directly adjacent catalytic converter modules are connected in a fixed manner in the region of their metallic casings which are rectangular in cross section, in particular by welding. In particular when in a catalytic converter unit a catalytic converter module has to be replaced, these welded connections have to be undone for example by disc grinding, as a result of which adjacent catalytic converter modules can be damaged. Accordingly, connecting adjacent catalytic converter modules by welding is disadvantageous.

SUMMARY OF THE INVENTION

There is therefore a need for a catalytic converter unit for a catalytic converter, in which catalytic converter modules can be more easily replaced. One aspect of the present invention is based on creating a new type of catalytic converter unit for an exhaust catalytic converter and an exhaust catalytic converter having such a catalytic converter unit.

According to one aspect of the invention, the catalytic converter modules are positioned with respective first flowed-through ends on a support grating, wherein the second flowed-through ends of the catalytic converter modules are located opposite at a counter-holder. The catalytic converter modules are clamped between the support grating and the counter-holder. The invention allows a simple replacement of catalytic converter modules of a catalytic converter unit without problems and without a risk of damage to adjacent catalytic converter modules.

According to an advantageous further development, the support grating comprises a plurality of first support braces running parallel to one another and a plurality of second support braces which likewise run parallel to one another and perpendicularly to the first support braces, on which the catalytic converter modules are positioned. Preferentially, a sealing element is positioned between support braces of the support grating running directly parallel to one another, on which directly adjacent catalytic converter modules are positioned, which prevents an exhaust gas flow between the casings of the adjacent catalytic converter modules. Support braces running directly parallel to one another preferentially provide an individual tolerance offset for the respective directly adjacent catalytic converter modules. This configuration of the catalytic converter unit is particularly advantageous. The flow of the exhaust gas through the catalytic converter modules is not negatively affected by the support grating. The sealing element prevents that exhaust gas does not flow through the catalytic converter bodies. The individual tolerance offset makes possible the particularly advantageous integration of the catalytic converter unit in a casing structure of an exhaust gas catalytic converter.

According to a further advantageous development, the counter-holder comprises a plurality of counter-holder braces running parallel to one another, wherein the counter-holder braces of the counter-holder act at a first end on a casing structure of an exhaust gas catalytic converter and at second ends located opposite interact with a hold-down brace extending perpendicularly to the counter-holder braces, wherein via the hold-down brace for clamping the catalytic converter modules between the support grating and the counter-holder a force is exertable on all counter-holder braces. Preferentially, a clamping force for clamping the catalytic converter modules between the support grating and the counter-holder is exertable via pushdowns, which on the one hand act on the hold-down brace and on the other hand on the casing structure of the exhaust gas catalytic converter. This further development of the catalytic converter unit is particularly preferred. The counter-holder braces, which interact with the hold-down brace, allow a simple clamping of the catalytic converter modules between the support grating and the counter-holder. By way of the pushdowns, the clamping force for clamping the catalytic converter modules can be exerted on the hold-down brace and via the hold-down brace on the counter-holder braces.

According to a further advantageous further development, spring elements elastically support the support grating on a casing structure of the exhaust catalytic converter and/or the hold-down brace on the casing structure of the exhaust gas catalytic converter and/or the counter-holder braces on the catalytic converter modules. This elastic support is advantageous for offsetting temperature-related expansions.

BRIEF DESCRIPTION OF THE DRAWINGS

Preferred further developments of the invention are obtained from the subclaims and the following description. Exemplary embodiments of the invention are explained in more detail by way of the drawing without being restricted to this.

There it shows.

DETAILED DESCRIPTION OF THE PRESENTLY PREFERRED EMBODIMENTS

Figure 1:
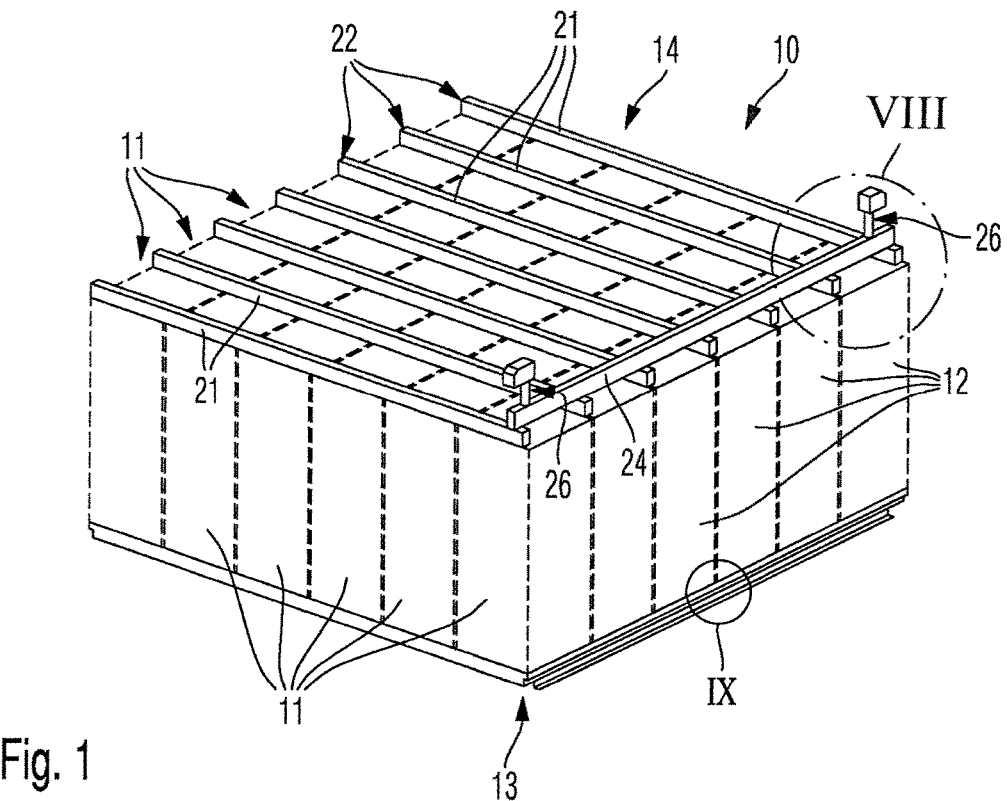
FIG. 1: is a perspective view of a catalytic converter unit for an exhaust gas catalytic converter according to the invention.
Figure 2:
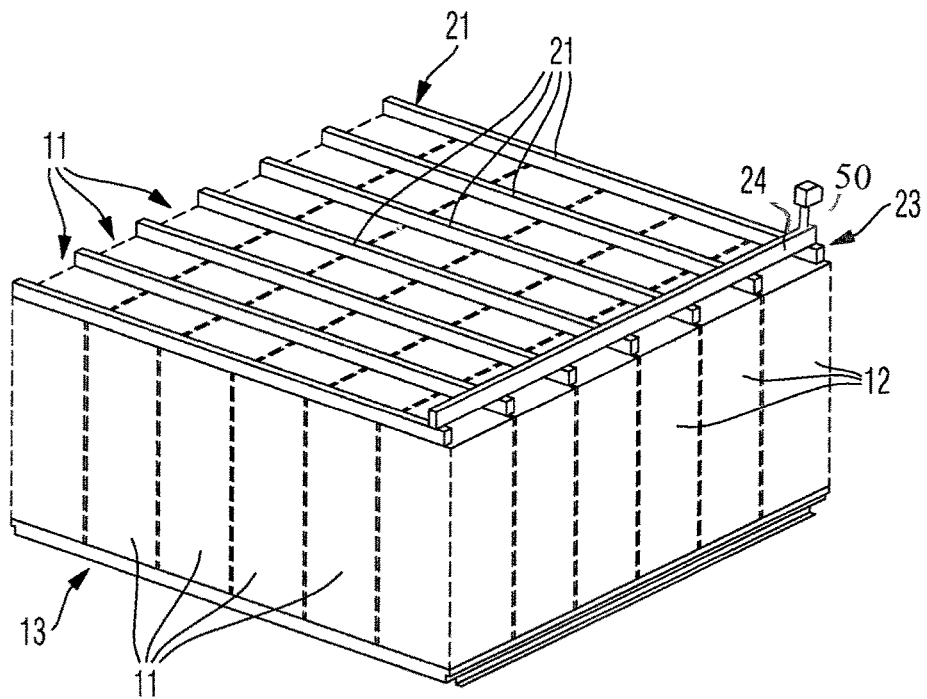
FIG. 2: is the catalytic converter unit of FIG. 1 without a pushdown.
Figure 3:
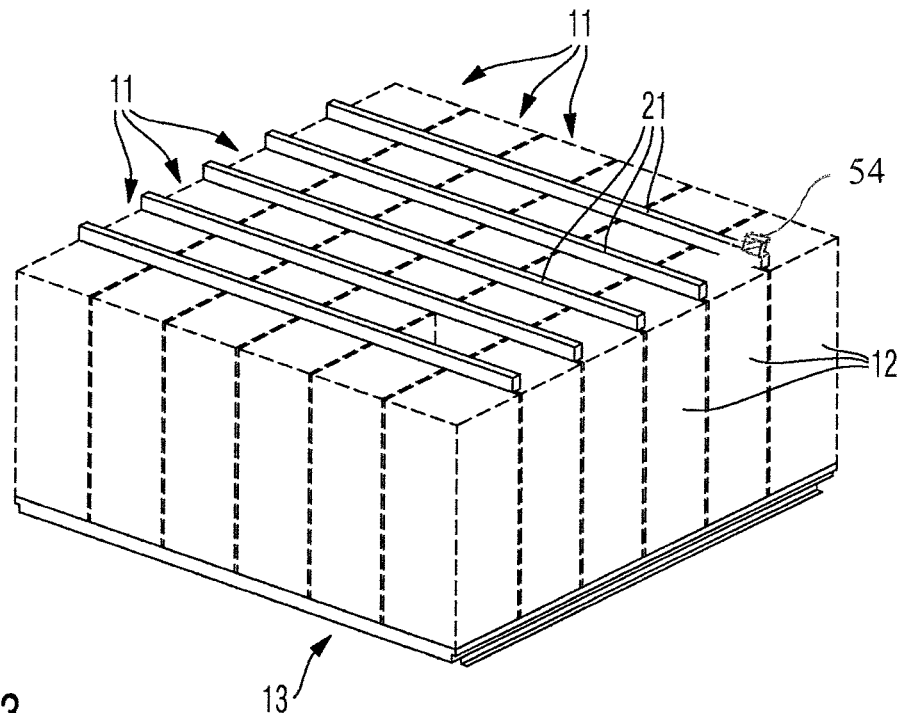
FIG. 3: is the arrangement of FIG. 2 without a hold-down brace.
Figure 4:
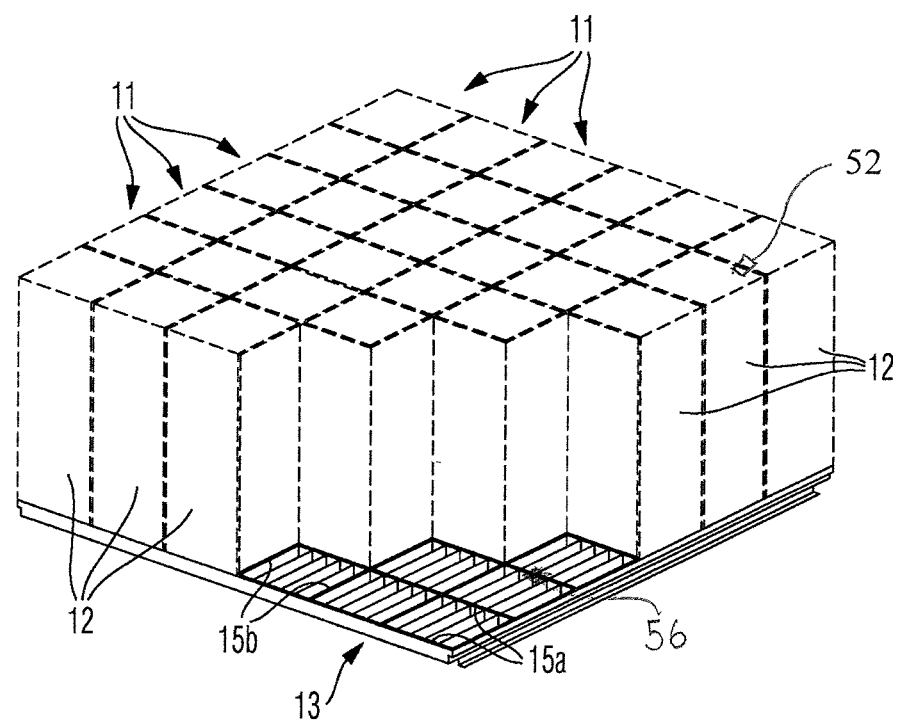
FIG. 4: is the arrangement of FIG. 3 without a counter-holder braces and with partly removed catalytic converter modules.
Figure 5:
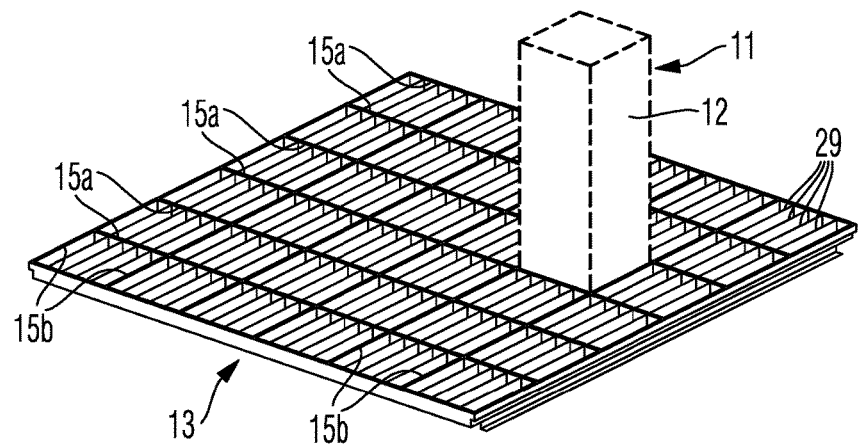
FIG. 5: is the arrangement of FIG. 4 with a single catalytic converter module.

The invention relates to a catalytic converter unit for an exhaust gas catalytic converter of an internal combustion engine for ship or marine applications and an exhaust gas catalytic converter. In particular, the catalytic converter unit according to the invention is designed as an SCR catalytic converter unit for an SCR exhaust gas catalytic converter of a ship diesel engine. FIGS. 1 to 9 show different views and details of a preferred exemplary embodiment of a catalytic converter unit.

The catalytic converter unit 10 according to the invention comprises a plurality of catalytic converter modules 11. The catalytic converter modules 11 are positioned array-like in the form of columns and lines directly next to one another. Each catalytic converter module 11 comprises a metallic casing 12, which accommodates a ceramic catalytic converter body, which is not shown. The metallic casings 12 in the shown exemplary embodiment have a rectangular cross section, wherein these casings 12 bound a rectangular catalytic converter body outside in certain sections. The casing 12, which is also called canning, leaves the catalytic converter body open on opposite ends subject to forming an inflow end and an outflow end of the respective catalytic converter module 11. The catalytic converter unit 10 comprises a support grating 13. The catalytic converter modules 11 are supported on the support grating 13 in the region of respective first flowed-through ends. At opposite second flowed-through ends of the catalytic converter modules 11, a counter-holder 14 is positioned. The catalytic converter modules 11 are clamped between the support grating 13 and the counter-holder 14.

Figure 6:
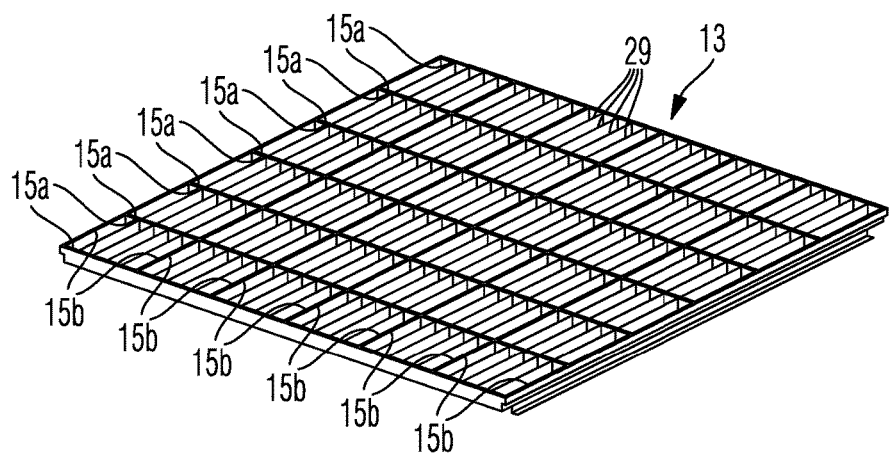
FIG. 6: is a support grating of the catalytic converter unit of FIG. 1.
Figure 7:
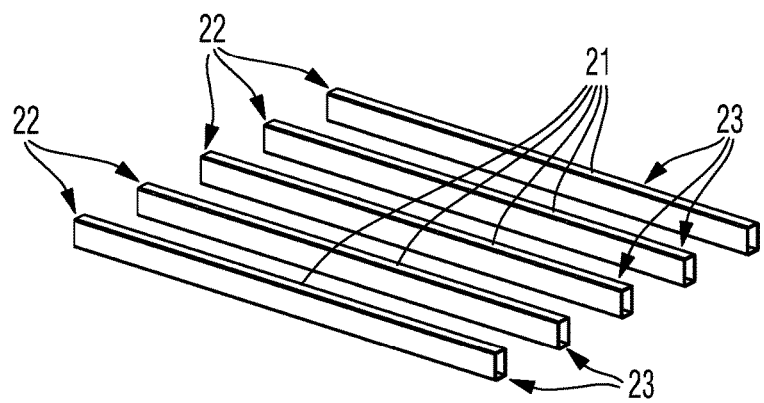
FIG. 7: are counter-holder braces of the catalytic converter unit of FIG. 1.
Figure 9:
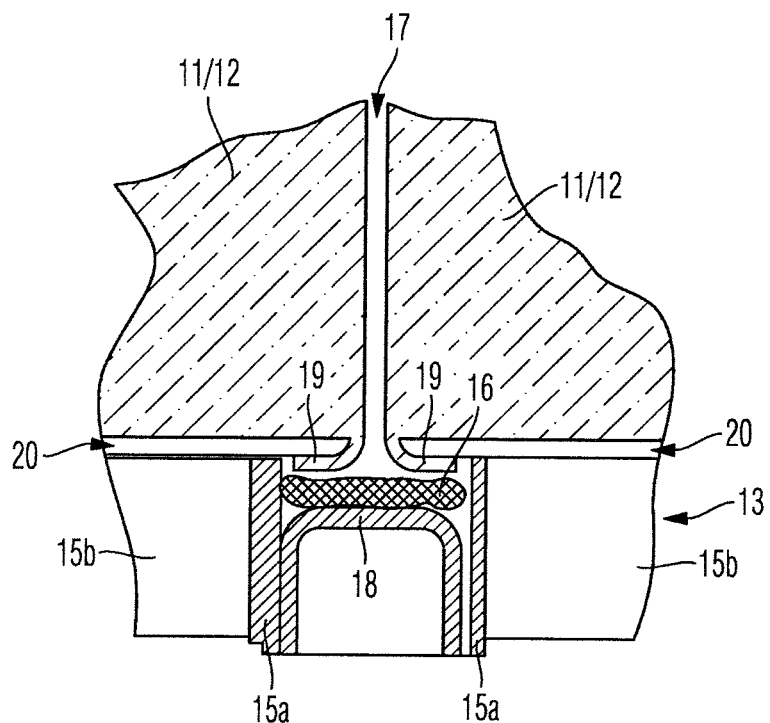
FIG. 9: is the detail IX of FIG. 1.

As is best evident from FIG. 6, the support grating 13 comprises a plurality of first support braces 15a running parallel to one another and a plurality of second support braces 15b likewise running parallel to one another and perpendicularly to the first support braces 15a, on which the catalytic converter modules 11 are positioned. Between support braces 15a and 15b of the support grating 13 running directly parallel to one another, on which directly adjacent catalytic converter modules 11 are positioned, a sealing element 16 (see FIG. 9) is arranged in each case, which prevents exhaust gas flowing through between the casings 12 of directly adjacent catalytic converter modules 11. Accordingly, a gap 17 between the casings 12 of two directly adjacent catalytic converter modules 11 is shown in FIG. 9, wherein the sealing element 16 prevents exhaust gas flowing through this gap 17 and accordingly ensures that all exhaust gas flow flows through the catalytic converter bodies of the catalytic converter modules 11. The sealing element 16 that is visible in FIG. 9 is positioned on a U-shaped sectional beam, which in FIG. 9 is positioned between support braces 15b of the support grating 13 running directly parallel to one another.

As is evident from FIG. 9, the casings 12 of the catalytic converter modules 11 have bent or flanged support feet 19 at their first flowed-through ends, which support themselves on a sealing element 16 or stand on the same. In order to enlarge the support area, thicker material then on the rest of the casing can be used at the ends of the casing instead of a flanging. Here, a width of 2 mm-20 mm at the front faces of the casing is advantageous. Between the support braces 15a, 15b and the first flowed-through ends of the catalytic converter modules 11, a gap 20 is formed shown in FIG. 9, which preferably disappears following the clamping of the catalytic converter modules 11 between the support grating 13 and the counter-holder 14.

As is evident from FIG. 9, individual support braces 15a, 15b of the support grating 13 interact with each catalytic converter module 11. The catalytic converter modules 11 engage with their support feet 19 in the free spaces defined between directly adjacent support braces 15a and 15b, in which the sealing elements 16 are positioned. In this way, the support braces 15a, 15b running parallel to one another provide an individual tolerance offset for dimension tolerances of the catalytic converter modules 11 so that the individual tolerances of adjacent catalytic converter modules 11 are not added up. Because of this, the catalytic converter unit 10 according to the invention can be particularly advantageously integrated in a casing structure of an exhaust gas reactor.

As already explained, the catalytic converter modules 11 are clamped between the support grating 13 and the counter-holder 14. The counter-holder 14 comprises a plurality of counter-holder braces 21 running parallel to one another. Each of the counter-holder braces 21 acts with a first end 22 on a casing structure of the exhaust gas catalytic converter, while at a second end 23 located opposite, a hold-down brace 24 extending perpendicularly to the counter-holder braces 21 interacts with the same. By way of the hold-down brace 24, a clamping force is exertable onto the counter-holder braces 21 for clamping the catalytic converter modules 11 in between the support grating 13 and the counter-holder 14. By way of this clamping force, the counter-holder braces 23 are pressed against the casing 12 of the catalytic converter modules 11 and thus ultimately the catalytic converter modules 11 against the support grating 13, as a consequence of which the catalytic converter modules 11 are clamped between support grating 13 and counter-holder 14.

Figure 8:
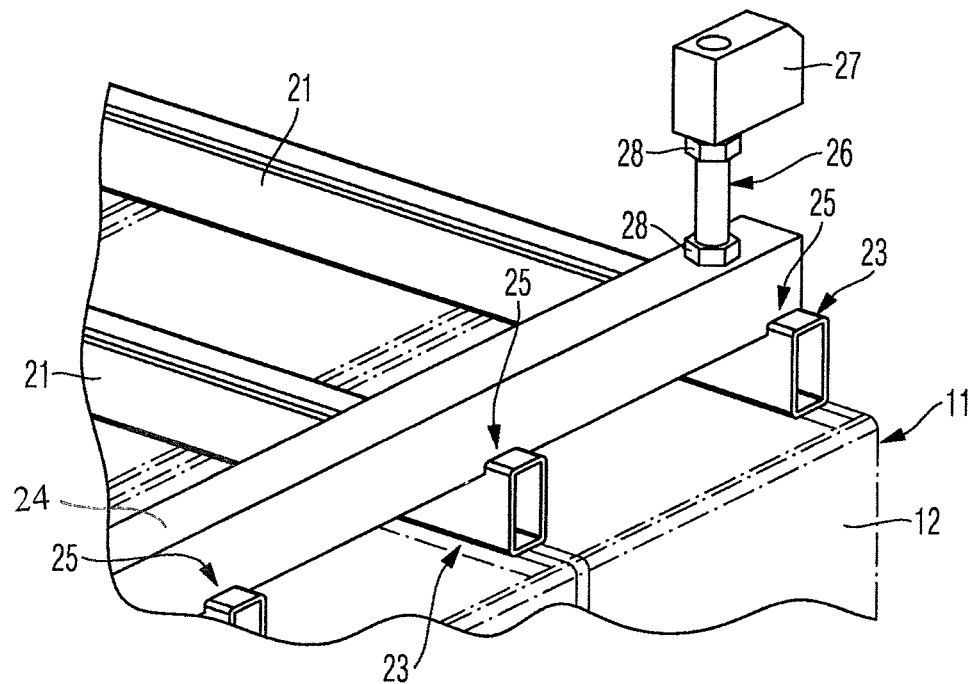
FIG. 8: is the detail VIII of FIG. 1.

As is best evident from FIG. 8, counter-holder braces 21, which extend along two rows or columns of catalytic converter modules 11 positioned directly adjacently, support themselves on the catalytic converter modules 11 of these directly adjacent rows or columns. Merely the outer counter-holder braces 21 merely support themselves on the catalytic converter modules 11 of a single row or column. As is best evident from FIG. 8, the hold-down brace 24 and/or counter-holder brace 21 comprises recesses 25, in which the other of the hold down brace 24 and/or counter-holder braces 21 engage in the region of their second ends 23.

The clamping force, which is to be exerted on the counter-holder braces 21 of the counter-holder 14 via the hold-down brace 24 is provided in the shown exemplary embodiment via two pushdowns 26, which act on opposite ends of the hold-down brace 24. As is best evident from FIG. 8, the respective pushdown 26 acts with an end on the hold-down brace 24 and with a second end on a casing structure 27 of a catalytic converter casing, wherein via the nuts 28 interacting with the pushdown 26 the distance between the casing structure 27 and the hold-down brace 24 and thus the clamping force can be adjusted. Accordingly, in the shown exemplary embodiment, the clamping force is exerted onto the casings 12 of the catalytic converter modules 11 via the hold-down brace 24 and the counter-holder braces 21. The clamping force is provided via two pushdowns 26, which act on opposite ends of the hold-down brace 24.

According to an advantageous further development of the invention it is provided to elastically mount the catalytic converter unit 10 via spring elements 56 which act between the support grating 13 and a casing structure of a catalytic converter casing of an exhaust gas catalytic converter or to support said catalytic converter unit 10 on this casing structure. Likewise, the counter-holder 14 can be elastically supported on the casing structure, namely via spring elements 50, which support themselves between the hold-down brace 24 and the casing structure 27. It is possible, furthermore, that spring elements 52 (FIG. 4) are provided, which elastically support the counter-holder braces 21 with respect to the casings 12 of the catalytic converter modules 11. Changes in the geometry of the catalytic converter unit 10 caused by temperature cycles can be offset by these spring elements. In addition it is possible to attach spring elements 54 (FIG. 3) between the counter-holder braces 21 and the hold-down brace 24 so that the tolerances of each counter-holder brace 21 and of the casing 12 located below the same can be offset. It is possible, furthermore, to produce the counter-holder braces in a flexible manner, for example from spring steel.

Accordingly, the catalytic converter unit 10 according to the invention comprises a plurality of catalytic converter modules 11, which are arranged array-like in columns and rows positioned directly next to one another. The catalytic converter modules 11 support themselves with their casings 12, which are rectangular in cross section, on a static support grating 13 via first ends. On the side of the catalytic converter modules 11 located opposite a counter-holder 14 is arranged, which comprises a plurality of moveable counter-holder braces 21 and a hold-down brace 24. The catalytic converter modules 11 are clamped between the static support grating 13 and the moveable counter-holder 14.

In the region of the support grating 14, the casings 12 of the catalytic converter modules 11 support themselves on support braces 15a, 15b running parallel to one another, wherein sealing elements 16 are positioned between directly adjacent support braces. For every two directly adjacent rows or columns of catalytic converter modules 11, a common counter-holder brace 21 is preferentially employed which is supported on edges of the casings 12 of the catalytic converter modules 11 which are adjacent in the directly adjacent rows or columns. An exception of this are the outermost catalytic converter rows or columns, in the case of which the corresponding counter-holder brace 21 lies on the casings of the catalytic converter modules 11 of a single row or column of catalytic converter modules 11.

Each counter-holder brace 21 is connectable in a fixed manner with an end 22 to a casing structure of a casing of the exhaust gas catalytic converter, while the common hold-down brace 24 acts on the opposite second end 23 of the counter-holder braces 21 in order to ultimately clamp the catalytic converter modules 11 between the support grating 13 and the counter-holder 14. Here, the clamping force can be exerted on the hold-down brace 24 via pushdowns 26.

Heat expansions of the catalytic converter unit 10 are preferentially offset by way of spring elements, which act on the support grating 13 and/or on the hold-down brace 24 and/or on the counter-holder braces 21.

An alternative for offsetting expansions consists in producing the counter-holder braces 21 and preferentially the hold-down brace 24 of the counter-holder 14 from an elastic material, in particular from spring steel. Because of this, any heat expansions that may occur can be directly absorbed and offset by the counter-holder 14.

A plurality of such catalytic converter units 10 can be employed in a casing of an exhaust catalytic converter. As is best evident from FIGS. 5 and 6, braces 29 run parallel to the support braces 15b of the support grating 13, which braces 29 serve to ensure that the support grating 13 can be walked on by persons without danger. These braces 29 do not obstruct exhaust gas flowing through the catalytic converter modules 11.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A catalytic converter unit for an exhaust gas catalytic converter, comprising:
   a plurality of catalytic converter modules each comprising:
      a metallic casing; and
      a ceramic catalytic converter body flowed through by exhaust gas arranged in the metallic casing and is surrounded by the metallic casing in certain sections;
   a support grating on which respective first flowed-through ends of the plurality of catalytic converter modules are arranged comprising:
      a plurality of first support braces running parallel to one another; and
      a plurality of second support braces running parallel to one another and perpendicularly to the plurality of first support braces on which the plurality of catalytic converter modules are positioned;
   a counter-holder arranged at a second flowed-through end of plurality of catalytic converter modules; and
   a seal arranged between the first and second first and second support braces of the support grating running directly parallel to one another, on which directly adjacent catalytic converter modules are positioned and configured to prevent exhaust gas flowing between the casings of the directly adjacent catalytic converter modules,
   wherein the plurality of catalytic converter modules are clamped between the support grating and the counter-holder.

2. The catalytic converter unit according to claim 1, wherein the seal is positioned on a sectional beam positioned between respective first and second support braces running directly parallel to one another.

3. The catalytic converter unit according to claim 1, wherein the first and second support braces running directly parallel to one another and provide an individual tolerance offset for the plurality of catalytic converter modules for the respective directly adjacent catalytic converter modules.

4. The catalytic converter unit according to claim 1, further comprising:
   springs configured to elastically support the support grating on a casing structure of an exhaust gas catalytic converter.

5. The catalytic converter unit according to claim 1, wherein the counter-holder comprises a plurality of counter-holder braces running parallel to one another.

6. The catalytic converter unit according to claim 5, wherein
   the counter-holder braces of the counter-holder act at a first end on respective casing structures of exhaust gas catalytic converters and at opposite second ends interact with a hold-down brace extending perpendicularly to the counter-holder braces,
   wherein via the hold-down brace a force is exertable on a plurality of counter-holder braces via the hold-down brace for clamping the plurality of catalytic converter modules between the support grating and the counter-holder.

7. The catalytic converter unit according to claim 5, wherein the counter-holder braces, which extend along directly adjacent catalytic converter modules clamp directly adjacent catalytic converter modules together with the support grating.

8. The catalytic converter unit according to claim 6, further comprising:
   pushdowns configured to provide a clamping force that clamps the plurality of catalytic converter modules between the support grating and the counter-holder, the pushdowns acting on the hold-down brace and on a casing structure of the exhaust gas catalytic converter.

9. The catalytic converter unit according to claim 6, wherein springs elastically support the hold-down brace on a casing structure of the exhaust gas catalytic converter.

10. The catalytic converter unit according to claim 5, wherein springs elastically support the counter-holder braces on the catalytic converter modules or on the hold-down brace.

11. The catalytic converter unit according to claim 5, wherein the counter-holder braces are produced from an elastic material.

12. A catalytic converter according to claim 1, wherein the exhaust gas catalytic converter is an SCR catalytic converter unit for an SCR exhaust gas catalytic converter of an internal combustion engine.

13. The catalytic converter unit according to claim 11, wherein the elastic material is spring steel.

14. An exhaust gas catalytic converter with a plurality of catalytic converter units according to claim 1.

* * * * *